United States Patent [19]
Tanoto

[11] Patent Number: 6,146,731
[45] Date of Patent: Nov. 14, 2000

[54] PERFORATED PAPER PRODUCTS

[75] Inventor: Rudy Ridwan Tanoto, Jakarta, Indonesia

[73] Assignee: PT Pabrik Kertas Tjiwi Kimia TBK, Indonesia

[21] Appl. No.: 09/226,882

[22] Filed: Jan. 7, 1999

[51] Int. Cl.$^7$ ..................................................... B32B 3/10
[52] U.S. Cl. ................... 428/43; 462/55; 462/63
[58] Field of Search ................ 428/43; 462/55, 462/63

[56] References Cited

U.S. PATENT DOCUMENTS

| | | | |
|---|---|---|---|
| 3,706,626 | 12/1972 | Smith et al. | 428/43 |
| 5,198,276 | 3/1993 | Nakajima | 428/43 |
| 5,557,311 | 9/1996 | Perrington et al. | 347/111 |
| 5,704,566 | 1/1998 | Schutz et al. | 242/595 |

*Primary Examiner*—Alexander S. Thomas
*Attorney, Agent, or Firm*—Hayes, Soloway, Hennessey, Grossman & Hage, P.C.

[57] ABSTRACT

A legal pad having a perforated tear line in which the slits located immediately adjacent the ends of the tear line, i.e. adjacent the central portion of the side edges of the pad, are longer than the slits making up the perforated tear lines, is provided in one aspect of the invention. In another aspect of the invention, a spiral notebook has an oval or tear shaped notch formed immediately inboard of the top edge of the individual paper sheets, and aligned with the perforation line of the spiral bound notebook. In a preferred embodiment of the invention, the perforation line comprises a plurality of microperforations not readily visible to the user, while the notch adjacent to the end is significantly larger than the microperforations, so as to also serve as a perforation indicator, and tear starter.

16 Claims, 3 Drawing Sheets

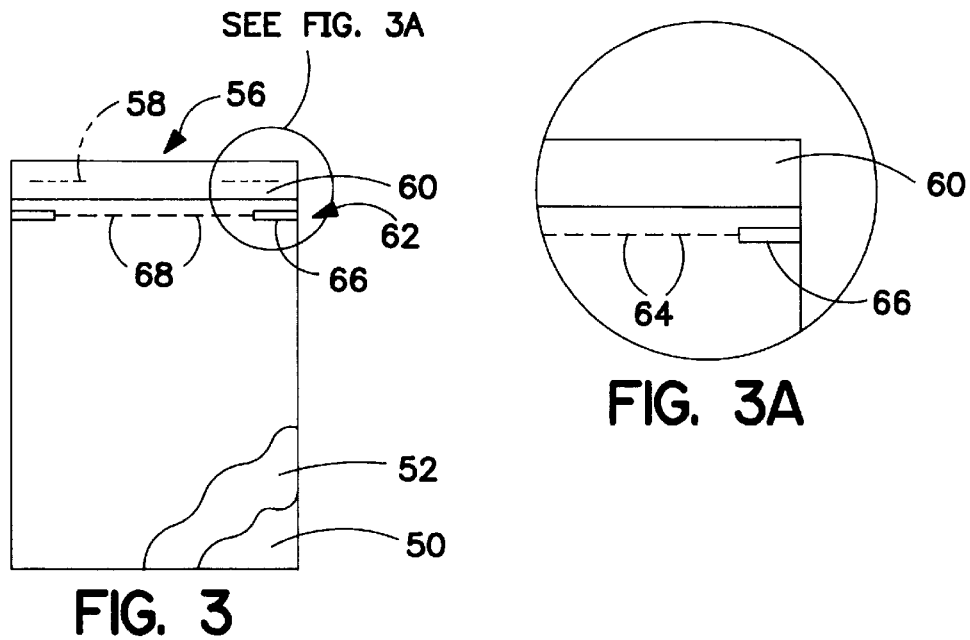
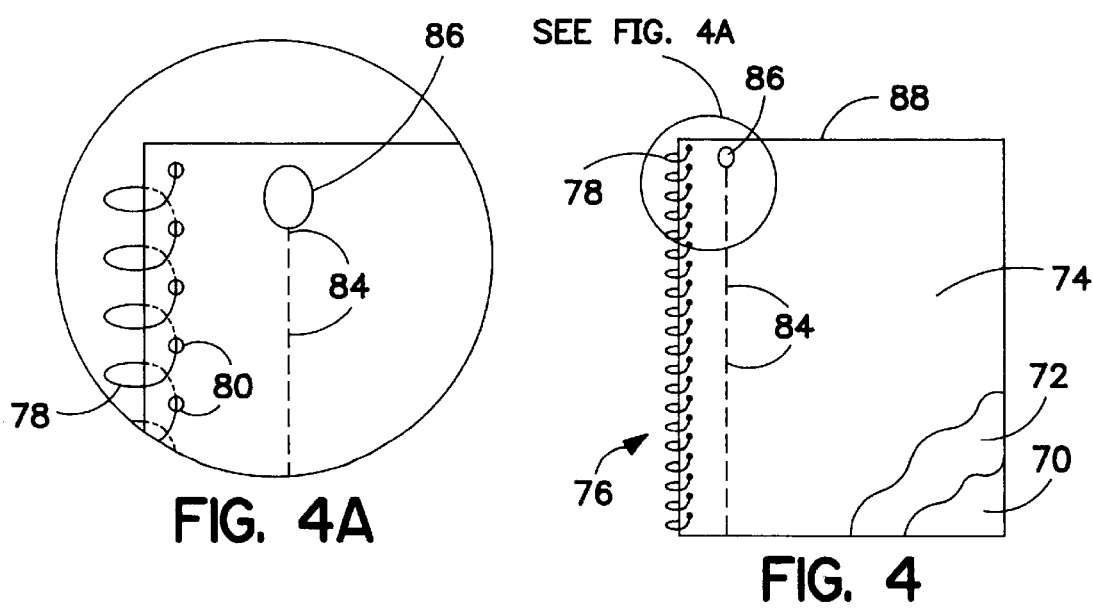

PERFORATED PAPER PRODUCTS

FIELD OF THE INVENTION

The present invention relates to paper products, and more particularly to perforated paper products. The invention has particular utility in connection with legal pads and spiral bound notebook pad products, and will be describing the connection with such utilities, although other utilities are contemplated.

DISCUSSION OF THE PRIOR ART

Bound legal pads and spiral bound notebooks are widely used in both office and school environments, and are available from several manufacturers. Referring to FIG. 1, a typical prior art legal pad comprises a cardboard back 10 upon which is stacked a plurality of identically sized lined paper sheets 12. The cardboard back 10 and stack of paper sheets 12 are stapled together at top end thereof by two or more staples (shown in phantom at 14). A paper or cloth tape 16 is folded over the top edge 18 of the back, and covers the staples 14.

A perforated tear line 20 is provided through each sheet 12 adjacent its top edge, and extending orthogonally to the side edges of the pad. Perforated tear line 20 comprises a plurality of spaced, equal length elongated, axially aligned slits having 22 (See FIG. 1a) having uniform widths, extending through each sheet of paper 12 and separated by frangible paper portions 24 extending therebetween.

The dimensions of slits 22 and frangible portions 24 are selected as a compromise balancing strength with tearability. In other words, perforated tear line 20 is made so that the individual sheets 12 of the legal pad ordinarily remain attached. Since it is necessary to ensure that the individual pages 12 will not be too readily torn out, perforated tear line 20 at best is a compromise favoring that the pages be left in tact. As a result, when a user desires to remove an individual page 12 from the pad, the user often encounters a problem in achieving a straight tear. Making the perforations larger, and the frangible portions smaller will facilitate tearing off individual sheets along a straight line; however, such will also compromise the ability of the pad to remain in tact, particularly as individual pages are folded over the top edge during use.

Referring to FIG. 2 and 2a, a typical spiral notebook comprises a back cover 30, a plurality of like sized paper sheets 32 and a front cover 34, arranged in a stack, and bound to one another adjacent one edge thereof by a metal or plastic spiral 38 which extends through apertures 40, formed adjacent a side edge 42 of the stack.

A perforated tear line 44 comprising a plurality of equal sized slits 46 separated by like size frangible paper portions 48 formed in a line located adjacent edge 42, and formal slightly inbound of perforations 40 so as to facilitate removal by the user of individual sheets. However, in the case of a spiral bound notebook, when one attempts to remove individual sheets along the tear line 44, sometimes the sheets rip through at the spiral holes 40 rather than along perforated tear line 44, resulting in a ragged sheet.

In order to overcome this problem, and to facilitate removal of individual sheets from a spiral bound notebook, some manufacturers provide a notching 50 aligned with perforated tear line 44 and adjacent one end thereof, e.g. the top end. Notch 50 is said to facilitate the start of the tear along perforated tear line 44. However, consumers have objected to the notching since it is too easy to inadvertently start a tear, for example, when a page is being turned. Also, consumers object to the aesthetics of the notching.

DISCLOSURE OF THE INVENTION

The present invention overcomes the aforesaid and other disadvantages of the prior art by providing, in the case of a legal pad, a perforated tear line in which the slits located immediately adjacent the ends of the tear line, i.e. adjacent the central portion of the side edges of the pad, are longer than the slits making up the perforated tear lines.

The present invention, in another aspect, provides a spiral notebook in which an oval or tear shaped notch is formed immediately inboard of the top edge of the individual paper sheets, and aligned with the perforation line of the spiral bound notebook. In a particularly preferred embodiment to the invention, the perforation line comprises a plurality of microperforations not readily visible to the user, while the notch adjacent to the end is made significantly larger than the microperforations, so as to also serve as a perforation indicator and tear starter.

Other features, advantages, and objects to the present invention will become apparent with reference to the following detailed description and accompanying drawings.

BRIEF DESCRIPTION OF THE DRAWINGS

FIGS. 3 and enlargement view 3a are plan views of a legal pad made in accordance with one embodiment to the present invention.

DETAILED DESCRIPTION OF THE PREFERRED EMBODIMENTS

Figure 1:
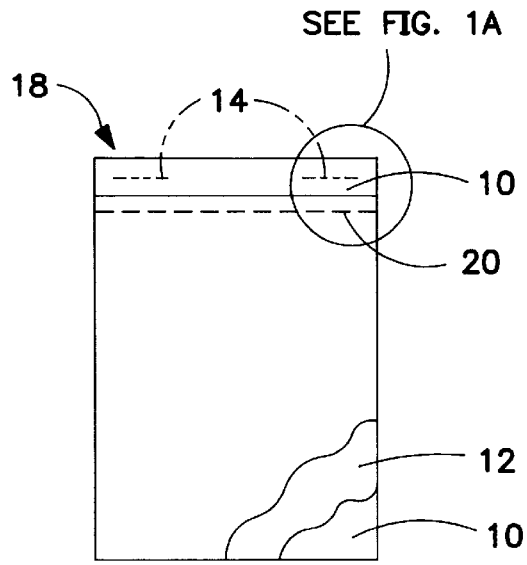
FIGS. 1 and enlargement view 1a are both plan views of a legal pad made in accordance with the prior art.
Figure 1A:
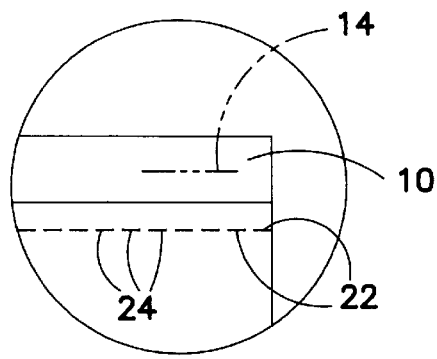

Referring to FIGS. 3 and 3a, there is provided a legal pad comprising a cardboard back 50, and a plurality of like sized paper sheets 52 stacked together, and affixed to one another along the top edge thereof 56 by a plurality of staples 58. A paper or cloth tape 60 is formed over the top edge 56, and covers the staples.

The individual paper sheets 52 each have a tear line 62 formed adjacent the top edge, below the staples 58 and tape 60. Perforated tear line 62 comprises a plurality of spaced, elongated, axially aligned slits 64 and 66. The perforated tear line 62 extends between and/or orthogonally relative to the side edges of the paper sheets 52.

Each of the perforated tear lines comprises a first plurality of spaced, elongated, axially aligned slits 64 having uniform widths extending through the paper sheets, and separated by like sized frangible paper portions 68 extending therebetween, inboard of the edges of the paper sheets. Immediately adjacent the two side edges of the paper sheets, are provided one or more notches or slits 66 which are aligned with slits 64, but are longer and wider than slits 64. By way of example, slits 64 may be a series of substantially round holes of about 0.3 millimeters diameter, or a series of slits of about 0.2–0.5 millimeters long by about 0.2–0.3 millimeters wide, while edge notch or slits 66 should be about 2.5–7.5 millimeters long by about 0.4–0.6 millimeters wide, preferably about 5.0 millimeters long by about 0.5 millimeters wide. Notches or slits 66 extend orthogonally relative to the side edges of the paper sheets, all the way to the edges of the sheets. Slits 66 serve to facilitate clean tearing of individual sheets by the user.

Figure 2A:
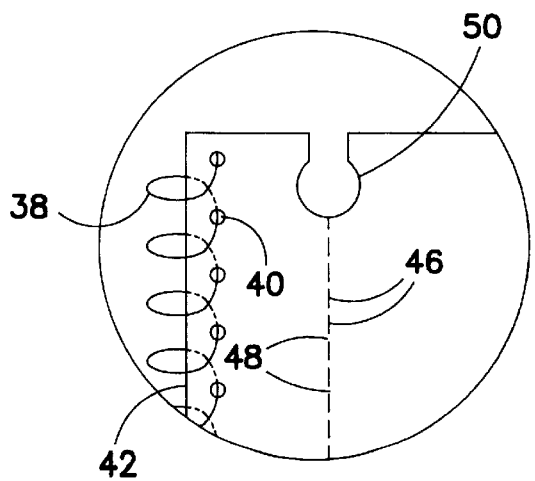
FIGS. 2 and enlargement view 2a are plan views of a spiral bound notebook made in accordance with the prior art.
Figure 2:
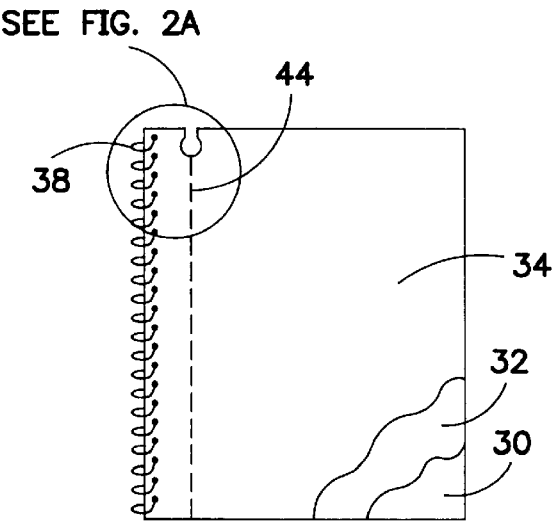
Figure 4B:
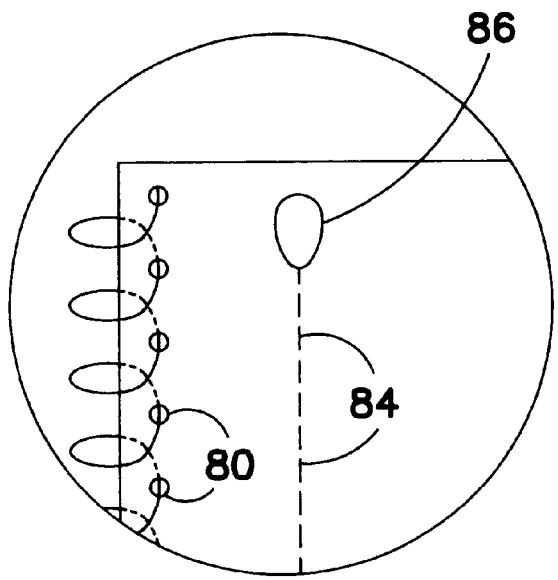
FIGS. 4 and enlargement views 4a, 4b and 4c are plan views of a spiral bound notebook made in accordance with another embodiment of the present invention.
Figure 4C:
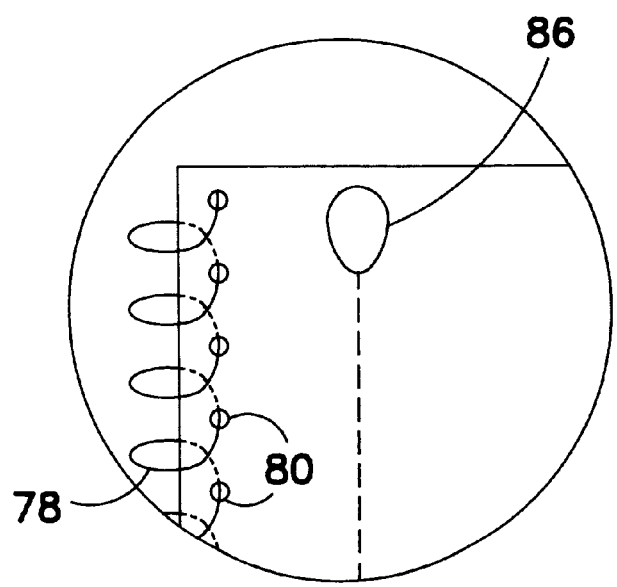

Referring to FIGS. 4 and 4a, there is illustrated a spiral bound notebook made in accordance with the present invention. The spiral bound notebook of FIGS. 4 and 4a is similar to the prior art spiral bound notebook of FIG. 2 in that it includes a back cover 70, a plurality of paper sheets 72 and a front cover 74, all bound together at side edge 76 by a spiral wire 78 extending through holes 80 formed in a line adjacent one edge of the covers 70, 74 and sheets 72.

A perforated tear line comprising a plurality of spaced apart elongated, axially aligned slits or perforations 84 having uniform widths and spacings, extends through the paper sheets 72 is formed adjacent to and inbound of holes 80. Perforations 84 preferably comprise so-called "microperforations", typically slits or round holes having a maximum dimension of about 0.2–0.4 millimeters. In a preferred embodiment of the invention, perforations 84 comprise slits or round holes having a maximum dimension of about 0.3 millimeters so that they are essentially invisible to the naked eye.

A shaped notch 86 is formed adjacent one end of perforated tear line 82 aligned with perforated tear line 82, and slightly inboard of the edge 88 of the paper sheets 72. Notch 86 preferably comprises an oval shaped (FIG. 4a), tear drop shaped (FIG. 4b) or egg shaped (FIG. 4c) notch, having its "wide end" adjacent the edge 88 of the paper sheet 72, with its narrow end inboard and aligned with perforated tear line 82. Notch 86 should be sufficiently large so as to be readily available to the visible eye, and should extend close to the top edge 88 of the paper sheets, while leaving a short segment, e.g. about 1.0–2.0 millimeters, preferably about 1.5 millimeters, of paper extending from the top edge of notch 86 to the edge 88 of the paper sheet. Notch 86 serves a dual purpose of providing a visible indicator to the user so that the sheets are perforated (this is particularly true in the case of the sheets having microperforations), and also serves as a tear starter.

While the invention has been described in connection with preferred embodiments, various changes may be made without departing from this spirit and scope thereof. For example, the microperforated tear line and notching described in connection with the spiral bound notebook advantageously may be adapted and used with legal pads or the like. Similarly, the straight notch perforated tear line described above with respect to legal pads, advantageously may be employed in connection with spiral bound notebooks. The invention also advantageously be adopted in connection with laboratory notebooks, receipt books and other forms of record books designed to provide a bound book with tear out sheets (e.g. wherein, only every other page is perforated). Still other changes may be made without the party from the spirit and scope of the invention.

What is claimed is:

1. In a perforated paper product comprising a plurality of paper sheets arranged in a stack, and affixed to one another adjacent a top edge thereof, and a perforated tear line formed through each of said paper sheets adjacent to and inboard of said top edge and extending orthogonally to side edges of the sheets, the improvement wherein the perforated tear line comprises a first plurality of spaced, substantially equal length, elongated, axially aligned slits having substantially uniform widths, extending through said sheets of paper, inboard of the side edges of the sheets, and a pair of rectangularly shaped open ended notches axially aligned with said slits, formed adjacent said side edges, said notches being longer than they are wide, and being wider than the slits of said first plurality.

2. In a perforated paper product according to claim 1, the improvement wherein the sheets are bound together by staples.

3. In a perforated paper product according to claim 1, the improvement wherein the sheets are spiral bound to one another.

4. In a perforated paper product according to claim 1, wherein said slits are about 0.2–0.5 millimeters long by about 0.2–0.3 millimeters wide.

5. In a perforated paper product according to claim 1, wherein said notches are about 2.5–7.5 millimeters long by about 0.4–0.6 millimeters wide.

6. In a perforated paper product according to claim 5, wherein said notches are about 5 millimeters long by about 0.5 millimeters wide.

7. In a perforated paper product comprising a plurality of paper sheets arranged in a stack, and affixed to one another adjacent a side edge thereof, and a perforated tear line formed through at least some of said paper sheets of paper adjacent to and inboard of said longated edge and extending orthogonally to the top and bottom edges of the sheets, the improvement wherein the perforated tear line comprises a first plurality of spaced, substantially equal length, elongated, axially aligned slits having substantially uniform widths, extending through said sheets of paper, inboard of the top and bottom edges of the sheets, and an oval, tear drop or egg shaped, closed notch axially aligned with said slits, formed adjacent said top edge, said oval, tear drop or egg shaped notch being wider than said slits.

8. In a perforated paper product according to claim 7, the improvement wherein the sheets are bound together by staples.

9. In a perforated paper product according to claim 7, the improvement wherein the sheets are spiral bound to one another.

10. In a perforated paper product according to claim 7, the improvement wherein the perforated tear line comprises a plurality of microperforations.

11. In a perforated paper product according to claim 10, the improvement wherein said microperforations have a maximum dimension of about 0.2–0.4 millimeters.

12. In a perforated paper product according to claim 7, the improvement wherein said microperforations have a maximum diameter of about 0.3 millimeters.

13. In a perforated paper product according to claim 7, the improvement wherein said oval, tear drop or egg shaped notch extends to within about 1.0–2.0 millimeters of the edge of the paper sheet.

14. In a perforated paper product according to claim 13, the improvement wherein said oval, tear drop or egg shaped notch extends to within about 1.5 millimeters of the edge of the paper sheet.

15. In a perforated paper product comprises a plurality of paper sheets arranged in a stack, and affixed to one another adjacent a top edge thereof, and a perforated tear line formed through each of said paper sheets adjacent to and inboard of said top edge and extending orthogonally side edges of the sheets, the improvement wherein the perforated tear line comprises a plurality of spaced, substantially round holes having substantially uniform diameters, extending through said sheets of paper, and formed in a line inboard of the side edges of the sheets, and a pair of rectangularly shaped open ended notch axially aligned with said line of holes, formed adjacent said side edges, said notches being longer than they are wide, and being wider than the diameters of said holes.

16. In a perforated paper product according to claim 15, wherein said substantially round holes each have a diameter of about 0.3 millimeters.

* * * * *

UNITED STATES PATENT AND TRADEMARK OFFICE
CERTIFICATE OF CORRECTION

PATENT NO.    : 6,146,731
DATED         : November 14, 2000
INVENTOR(S)   : Rudy Ridwan Tanoto It is certified that error appears in the above-identified patent and that said Letters Patent is hereby corrected as shown below:

Column 4,
Line 14, change "longated" to -- side --.
Line 57, change "notch" to -- notches --.

Signed and Sealed this

Tenth Day of September, 2002

*Attest:*

*Attesting Officer*

JAMES E. ROGAN
*Director of the United States Patent and Trademark Office*